(12) United States Patent
Mori et al.

(10) Patent No.: US 6,382,246 B2
(45) Date of Patent: May 7, 2002

(54) VALVE POSITION DETECTOR

(75) Inventors: Akiyoshi Mori, Yokohama; Makoto Adegawa, Kawasaki; Haruki Kobayashi, Fujisawa, all of (JP)

(73) Assignee: Fuji Oozx, Inc., Kanagawa-ken (JP)

( * ) Notice: Subject to any disclaimer, the term of this patent is extended or adjusted under 35 U.S.C. 154(b) by 0 days.

(21) Appl. No.: 09/907,061

(22) Filed: Jul. 17, 2001

Related U.S. Application Data

(62) Division of application No. 09/410,821, filed on Oct. 1, 1999, now Pat. No. 6,293,303.

(30) Foreign Application Priority Data

Oct. 20, 1998 (JP) .............................................. 10-297690
Aug. 30, 1999 (JP) ........................................... 11-243069

(51) Int. Cl.$^7$ .............................................. F16K 37/00
(52) U.S. Cl. ............... 137/554; 123/90.11; 340/870.37; 324/682
(58) Field of Search .......................... 137/554; 123/90.1, 123/90.11; 340/870.37; 324/660, 681, 682, 686

(56) References Cited

U.S. PATENT DOCUMENTS

| | | |
|---|---|---|
| 4,862,063 A | 8/1989 | Kobayashi et al. |
| 5,418,468 A | 5/1995 | Baker et al. |
| 5,898,298 A * | 4/1999 | Brandsma et al. ...... 324/682 X |
| 5,983,847 A * | 11/1999 | Miyoshi et al. ......... 123/90.11 |

FOREIGN PATENT DOCUMENTS

| | | |
|---|---|---|
| DE | 197 44 741 | 3/1999 |
| DE | 198 11 779 | 4/1999 |
| EP | 0867 602 A | 9/1990 |

* cited by examiner

*Primary Examiner*—John Rivell
(74) *Attorney, Agent, or Firm*—Oppenheimer Wolff & Donnelly LLP

(57) ABSTRACT

A poppet valve moves up and down in a valve operating mechanism in an internal combustion engine. A cylindrical fixed electrode is fixed to a support plate on a cylinder head, and a cylindrical moving electrode is mounted to the lower surface of a valve spring retainer which is mounted to the poppet valve via a cotter. The fixed electrode is connected to a circuit which comprises a variable condenser and a resistance. The valve moves up and down during firing operation of the engine. Thus, variation in electrostatic capacity is detected by the two electrodes, transmitted to a circuit via a lead mounted to the fixed electrode, and converted to a voltage by the circuit, thereby detecting valve position exactly.

3 Claims, 10 Drawing Sheets

VALVE POSITION DETECTOR

This application is a Divisional of application Ser. No. 09/410,821 filed on Oct. 1, 1999, now U.S. Pat. No. 6,293,303, which claims priority of Japan Application No. 10-297690 filed Oct. 20, 1998 and Japan Application No. 11-243069 filed Aug. 30, 1999.

BACKGROUND OF THE INVENTION

The present invention relates to a valve position detector which exactly detects position of a valve during firing in an engine.

When components in a valve operating mechanism are changed in specification, actual position of a poppet valve is measured to evaluate the components depending on movement characters or to investigate followability of the valve to a cam. For measurement, axial position of the valve or components which move therewith such as a valve spring retainer is detected by a sensor.

However, in a direct acting type valve operating mechanism, not only an axial end of the valve but also a valve spring retainer which is mounted via a cotter is positioned in a cap-like tappet, and in a relatively small engine, there is no space for the sensor around the valve operating mechanism, so that it is very difficult to detect position of the valve or valve spring retainer directly.

Therefore, a piston and a connecting rod are detached from a cylinder block of the engine, and a non-contacting displacement sensor such as an approach sensor is provided just under the valve in the cylinder. By operating the engine on a support, axial displacement of the valve is determined at a valve head.

Such measurement on the support is not the same as actual measurement of the valve during firing of the engine. Thus, combustion pressure in the cylinder or influence to valve such as back pressure of an exhaust system cannot be determined exactly. In measurement by the approach sensor, detection accuracy is poor.

Instead of a valve operating mechanism by an ordinary cam, various electromagnetic valve drivers are suggested to open and close a valve by magnetic force.

In such a valve drive system, to control opening/closing time of the valve exactly depending on operating condition of the engine, it is indispensable to provide a valve position detector to detect a present position of the valve at high accuracy and to make feedback control of electric current to an electromagnet for driving the valve. Thus, it is required to provide a high accuracy valve position detector instead of the above small approach sensor.

SUMMARY OF THE INVENTION

In view of the disadvantages in the prior art, it is an object of the present invention to provide a small valve position detector for determining a valve position at high accuracy during firing of an engine regardless of kinds of a valve operating system.

BRIEF DESCRIPTION OF THE DRAWINGS

The features and advantages of the present invention will become more apparent from the following description with respect to embodiments as shown in appended drawings wherein.

DETAILED DESCRIPTION OF PREFERRED EMBODIMENTS

Figure 1:
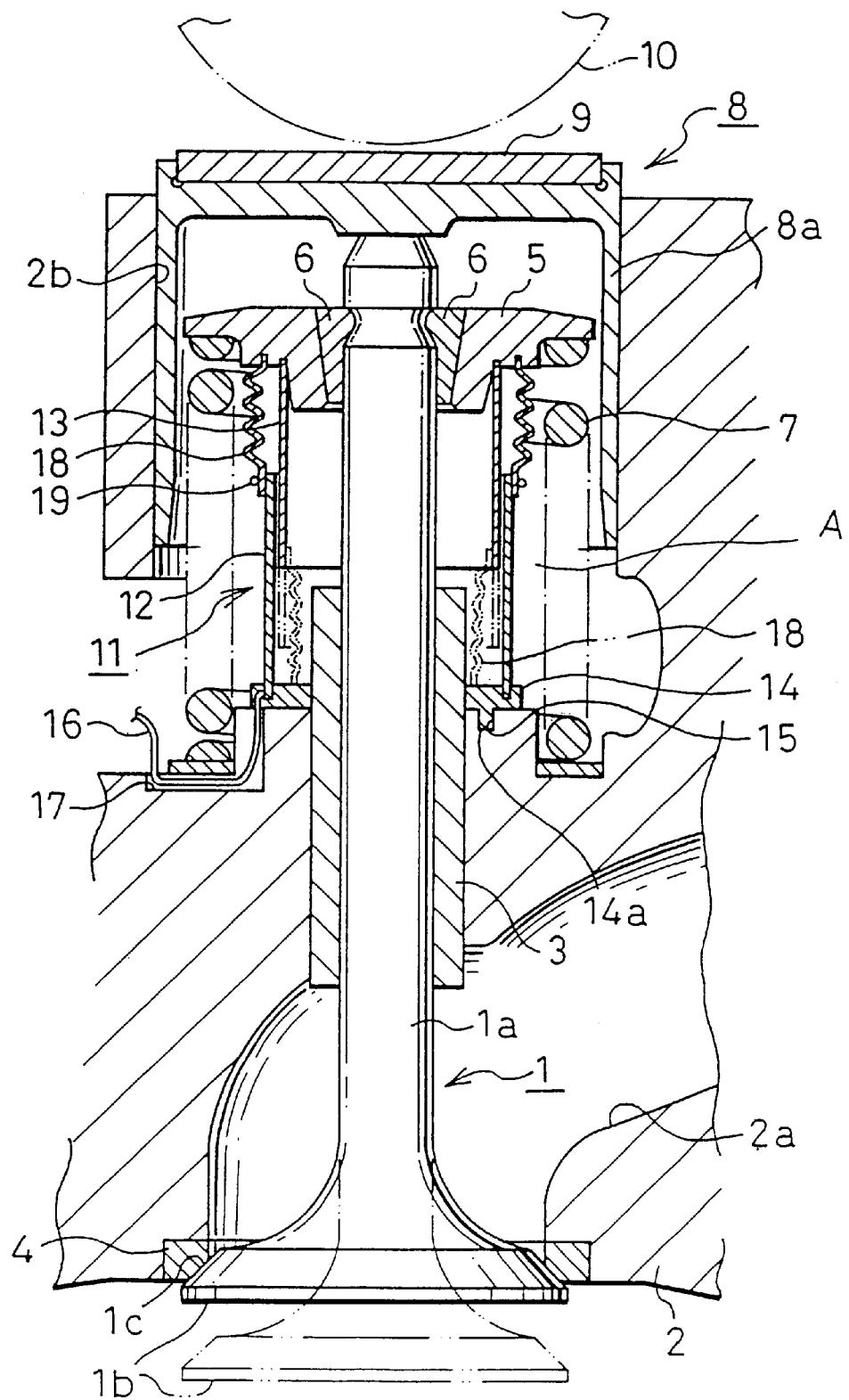
FIG. 1 is a central vertical sectioned front view of a direct acting type valve operating mechanism which has the first embodiment of a valve position detector according to the present invention.

FIG. 1 illustrates a direct acting type valve operating mechanism which has one embodiment of the present invention, in which a valve stem 1a of a poppet valve 1 is slidably supported by a valve guide 3 which is fitted above an intake or exhaust port 2a of a cylinder head 2.

A tapered valve face 1c of a valve head 1b at the lower end of the valve 1 is engaged on a valve seat 4 which is a press fit in the port 2a of the cylinder head 2.

A valve spring retainer 5 is held via a pair of cotters 6 at the upper end of the valve stem 1a, and a valve spring 7 is provided between the valve spring retainer 5 and the cylinder head 2. The valve stem 1a of the valve 1 is concentrically surrounded by the valve spring 7.

At the upper end of the valve stem 1a of the valve 1, the valve spring retainer 5 and the valve spring 7A are covered with a cylindrical tappet 8 in which the upper end is closed. A cylindrical portion 8a of the tappet 8 is slidably engaged in a vertical guide bore 2b of the cylinder head 2.

A cam 10 is slidably engaged on a shim 9 which fits in a recess at the upper surface of the tappet 8. By rotation of the cam 10, the valve 1 is pressed downwards against the valve spring 7, so that opening and closing are carried out.

A variable capacity electrode 11 for forming a displacement sensor with a circuit as below is provided around the valve stem 1a of the valve 1 in an annular space "A" which is defined by the valve stem 1a of the valve 1, the valve guide 3 which is projected on the cylinder head 2 and the valve spring 7.

The variable capacity electrode 11 comprises a cylindrical fixed electrode 12 and a conductive cylindrical moving electrode 13 which has an outer diameter slightly smaller than an inner diameter of the fixed electrode 12. A lower half of the moving electrode 13 is provided in an upper half of the fixed electrode 12 with a predetermined gap to form an opposing area variable electrode or an variable condenser.

The lower end of the fixed electrode 12 is concentrically fixed with the valve 1 via an insulating support plate 14 made of synthetic resin or ceramics. The support plate 14 is placed on the upper surface of the cylinder head 2 at the upper portion of the valve guide 3. The support plate 14 has one or more projections 14a on the lower surface. The projection 14a is engaged in a recess 15 of the cylinder head 2 to prevent rotation of the support plate 14 around an axis. The upper end of the moving electrode 13 is fixed on the lower surface of the valve spring retainer 5 so that the moving electrode 13 is concentric with the valve 1.

The fixed electrode 12 is made of stainless steel, Al alloy or Cu alloy, and the moving electrode 13 is made of light metal alloy such as Al alloy to lighten it. The valve spring retainer 5 is priorly lightened by weight of the moving electrode 13 to prevent increase in inertial mass. The moving electrode 13 is electrically connected to the cylinder head 2, an engine body or the body of a car as earth potential via the valve spring retainer 5, valve spring 7, cotter 6, valve 1, valve guide 3, etc.

A lead 16 for taking out electrical power output is connected to the fixed electrode 12, and is introduced out of the valve spring 7 through a wiring groove 17 of the cylinder head 2. The end of the lead 16 is connected to a circuit of an external measuring instrument (not shown).

Between the fixed electrode 12 and the valve spring retainer 5, there is provided a bellows-like tubular cover 18 which is vertically flexible depending on movement of the valve spring retainer 5 and which is made of rubber or synthetic resin. The upper and lower ends of the tubular cover 18 are fixed to the lower surface of the valve spring retainer 5 and the outer circumferential surface of the fixed electrode 12 respectively. Numeral 19 denotes a tightening ring. The tubular cover prevents lubricating oil or other foreign substance from invading between the electrodes 12 and 13 to increase measurement accuracy.

Figure 3:
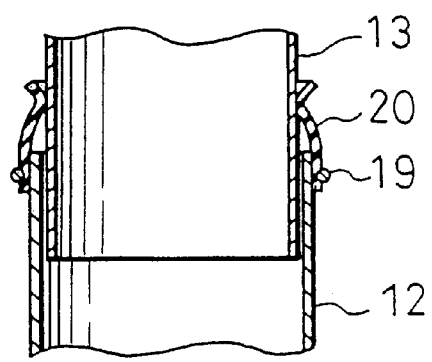
FIG. 3 is a vertical sectional view of a variation of a cover of FIG. 1.

As shown in FIG. 3, the lower end of an insulating tubular cover or sealing member 20 made of rubber or synthetic resin may be fixed on the outer circumferential surface of the upper end of the fixed electrode 12 by the tightening ring 19, and the inner circumferential surface of the upper end is elastically pressed on the outer circumferential surface of the moving electrode 13 to prevent foreign substance from invading into between the electrodes 12 and 13. The cover 18 may be made of soft rubber diaphragm.

Figure 2:
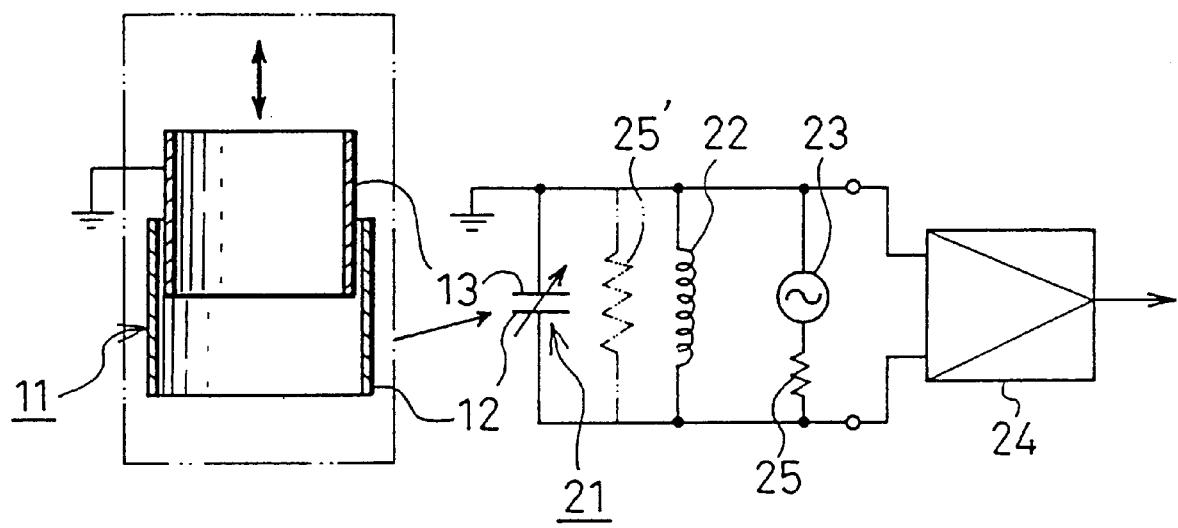
FIG. 2 is a view of an electrostatic capacity sensor circuit with a variable capacity electrode in FIG. 1.

FIG. 2 illustrates a circuit for determining position of the valve by converting variation in electrostatic capacity between the fixed and moving electrodes 12 and 13 to voltage which is outputted. An electrostatic displacement sensor is formed by the electrodes 12, 13 and the circuit.

A variable condenser 21 comprises a fixed electrode 12 and a moving electrode 13 as the variable capacity electrode 11, and the moving electrode 13 is provided as earth potential.

The electrodes 12, 13 of the variable condenser 21 is connected in parallel with a coil 22 and a high frequency power source 23 in series with a resistance 25. A terminal voltage of a parallel circuit which comprises a variable condenser 21 and a coil 22 is amplified by an amplifier 24 and outputted, so that position of the valve 1 is converted to voltage, which is measured.

Owing to opening/closing position of the valve 1, an opposing area between the electrodes 12 and 13 is varied to cause variation in electrostatic capacity and impedance, so that output voltage is proportionally changed, thereby detecting position of the valve 1 at high accuracy.

To obtain stable output character, a resistance 25' may be connected to the circuit. A circuit for temperature compensation of a sensor may be added, but is not shown.

As mentioned in the foregoing embodiment, the electrostatic displacement sensor is formed as an opposing area varying shape, and the variable capacity electrode 11 which comprises the fixed and moving electrodes 12 and 13 is tubular to decrease axial size of the variable capacity electrode 11, so that the electrodes 12,13 can be provided in a small gap between the valve 1 and the valve spring 7. In a direct acting type valve operating mechanism which has the tappet 8 which is difficult in measurement, actual position of the valve 1 can be determined without problem at high accuracy during firing operation. When components in a valve operating mechanism are modified in specification, actual position of the valve 1 is exactly determined to evaluate valve-operating components and study followability of the valve 1 to the cam 10.

Figure 4:
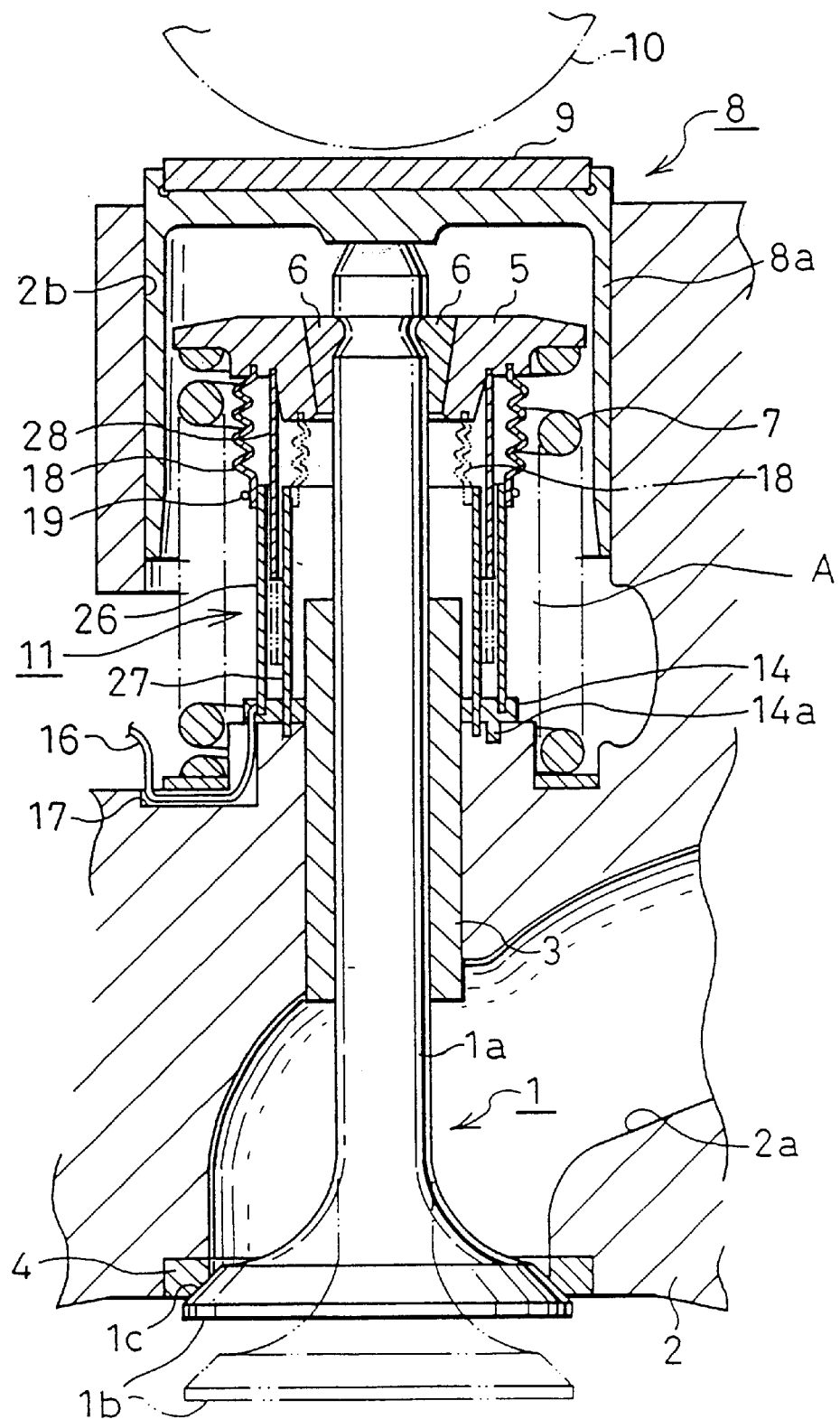
FIG. 4 is a central vertical sectioned front view of a direct acting type valve operating mechanism which has the second embodiment of a valve position detector according to the present invention.

FIG. 4 illustrates the second embodiment of the present invention. This embodiment is different from the first embodiment only in a variable capacity electrode. The same numerals are allotted to the same members in the foregoing embodiment, and its detailed description is omitted.

The variable capacity electrode 11 comprises a first conductive cylindrical fixed electrode 26 fixed concentrically with a valve to an insulating support plate 14, a second conductive cylindrical fixed electrode 27 which is smaller in diameter than the first fixed electrode 26, and an insulating cylindrical dielectric 28 the upper end of which is fixed to the lower surface of a valve spring retainer 5 so that a lower half of the dielectric 28 may be inserted in a small gap between the electrodes 26 and 27 with play.

The first fixed electrode 26 is connected to an outside circuit via a lead 16 similar to the first embodiment, and the second fixed electrode 27 is electrically connected to a cylinder head 2 as an earth potential.

The first and second fixed electrodes 26 and 27 constitute a condenser to form a circuit similar to that in FIG. 2. Thus, electrostatic capacity displacement sensor, or an inductivity variable displacement sensor is formed according to action of a dielectric 28. The dielectric 28 between the first and second fixed electrodes 26 and 27 moves up and down to vary inductivity and electrostatic capacity between the electrodes 26 and 27. Therefore, variation in the electrostatic capacity is converted to a voltage and outputted, thereby determining position of the valve.

In the embodiment, the second fixed electrode 27 which is thin and cylindrical is only added, thereby avoiding large size of the variable capacity electrode 11. Similar to the foregoing embodiment, position of the valve 1 can be determined by connecting it to a direct-acting type valve operating mechanism similar to the foregoing embodiment.

Figure 5:
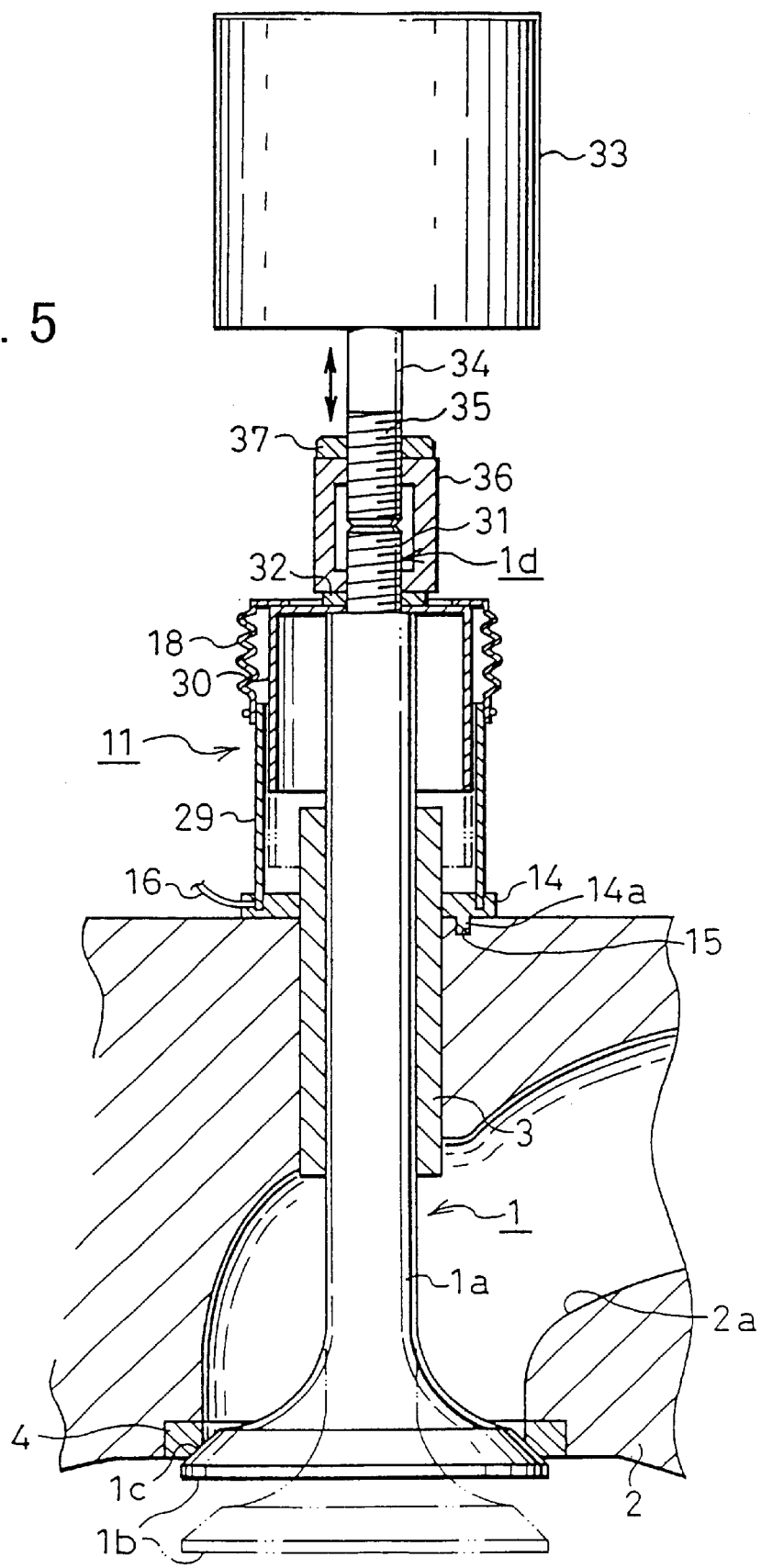
FIG. 5 is a central vertical sectioned front view of a direct acting type valve operating mechanism which has the third embodiment of a valve position detector according to the present invention.

FIG. 5 illustrates the third embodiment of the present invention which is applied to a valve operating mechanism which has an electromagnetic actuator. The same numerals are allotted to the same members as those in the foregoing embodiments. An insulating support plate 14 surrounds a valve guide 3 on the upper surface of the cylinder head 2. The lower end of a fixed electrode 29 similar to that in FIG. 1 is concentrically fixed on the support plate 14.

A conductive cylindrical moving electrode 30 is fixed to a smaller diameter valve stem 1d at the upper end of a valve stem 1a of a valve 1 by a fixing plate 32 which is engaged on a thread 31 of the smaller diameter valve stem 1d. The fixed and moving electrodes 29 and 30 constitute an opposing area variable capacity electrode (condenser) 11 similar to that in FIG. 1. The moving electrode 30 is defined as earth potential, and a lead 16 connected to the fixed electrode 29 is connected to an outside measuring instrument to constitute a circuit as shown in FIG. 2 to form a electrostatic capacity displacement sensor.

Between the outer circumferential surface of the upper end of the fixed electrode 29 and the upper end of the moving electrode 30, a bellows-like tubular cover 18 similar to the above is mounted to prevent foreign substance from invading between the electrodes 29 and 30.

An electromagnetic actuator 33 is provided on the upper end of the valve 1. The lower end of a drive shaft 34 of the actuator 33 is connected to the upper end of the valve 1 by a connecting member 36 which is engaged with an external thread 35 of the shaft 34 and an external thread 31 of a smaller diameter shaft 1d of the valve 1. Numeral 37 denotes a lock nut.

The electromagnetic actuator 33 does not directly relate to the present invention, and its structure is not described in detail. For example, in the actuator 33, an iron piece which is connected to the drive shaft 34 is provided between a pair of upper and lower electromagnets, and an electric current to the upper and lower electromagnets is controlled to suck the iron piece up to drive the valve 1 depending on operational condition of an engine.

In this embodiment, actual position of the valve 1 can be determined at high accuracy during firing operation of the engine. Thus, owing to feed-back control of the electromagnetic actuator 33 based on signal thus determined, opening/closing time of the valve can be optimally controlled depending on operation condition of the engine.

The variable capacity electrode 11 may comprise an inductivity variable electrode as shown in FIG. 4 in this embodiment, but is not shown. A sealing member as shown in FIG. 3 may be used instead of the bellows-like tubular cover 18.

Figure 6:
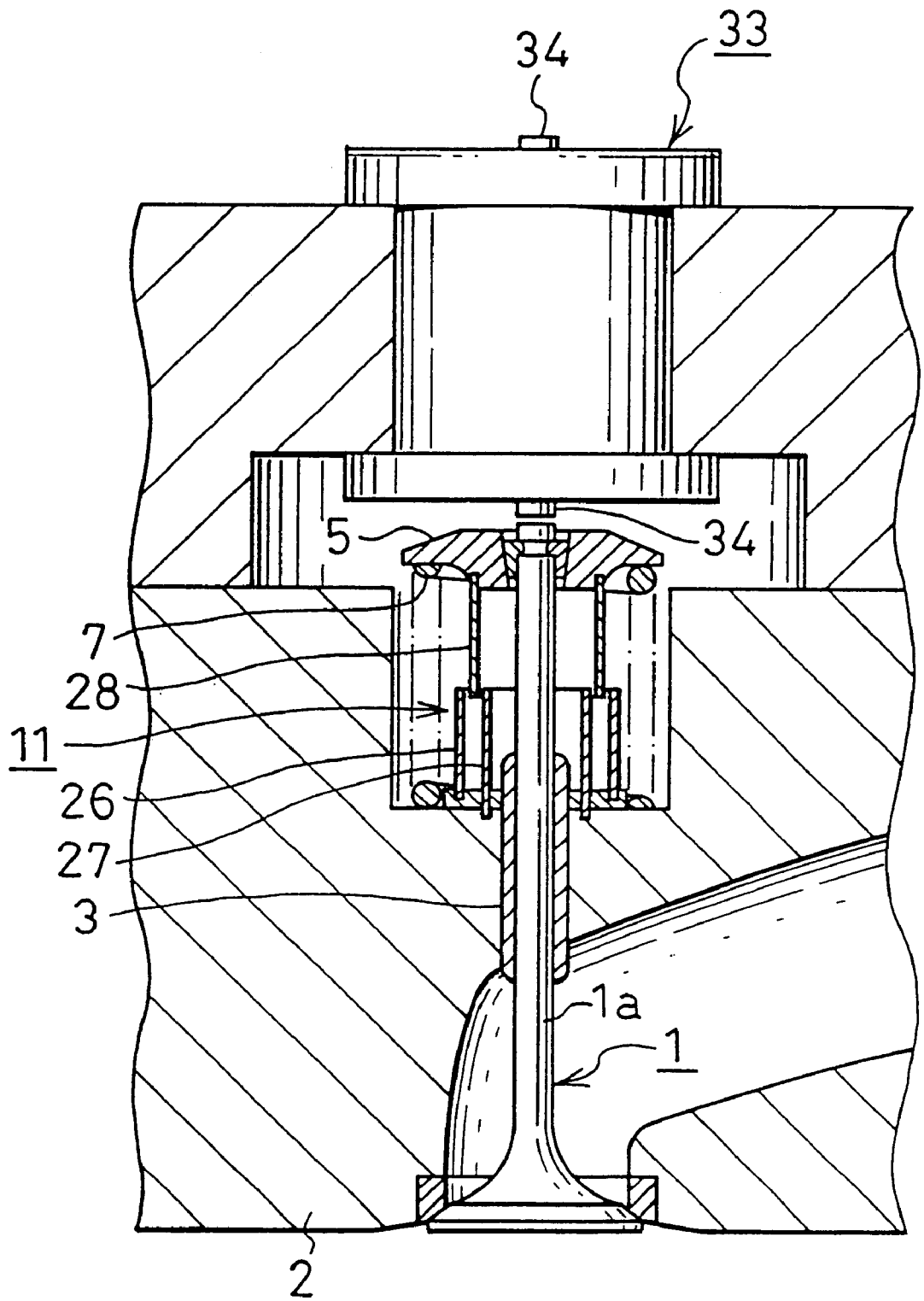
FIG. 6 is a central vertical sectioned front view of a direct acting type valve operating mechanism which has the fourth embodiment of a valve position detector according to the present invention.
Figure 7:
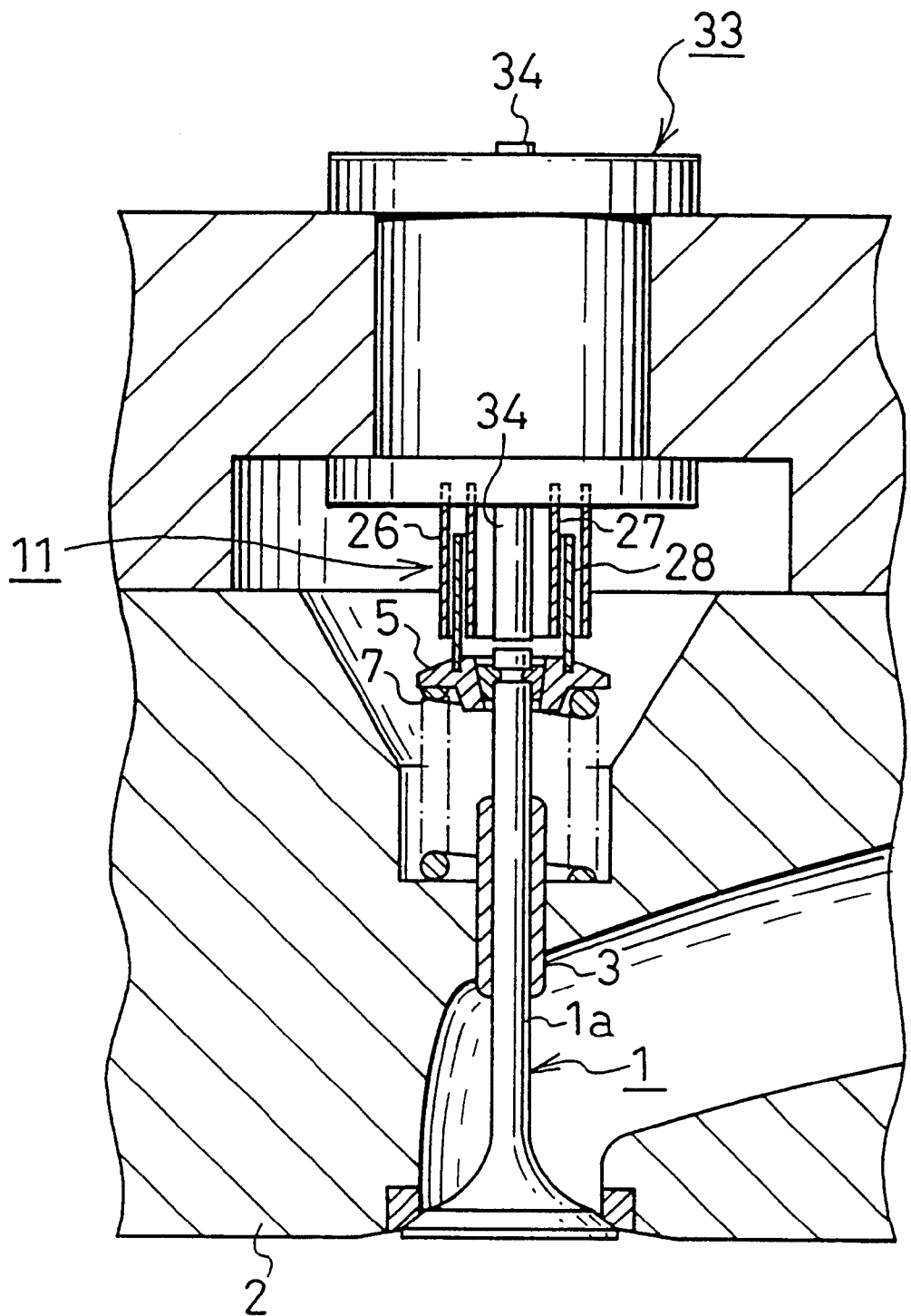
FIG. 7 is a central vertical sectioned front view of a direct acting type valve operating mechanism which has the fifth embodiment of a valve position detector according to the present invention.
Figure 8:
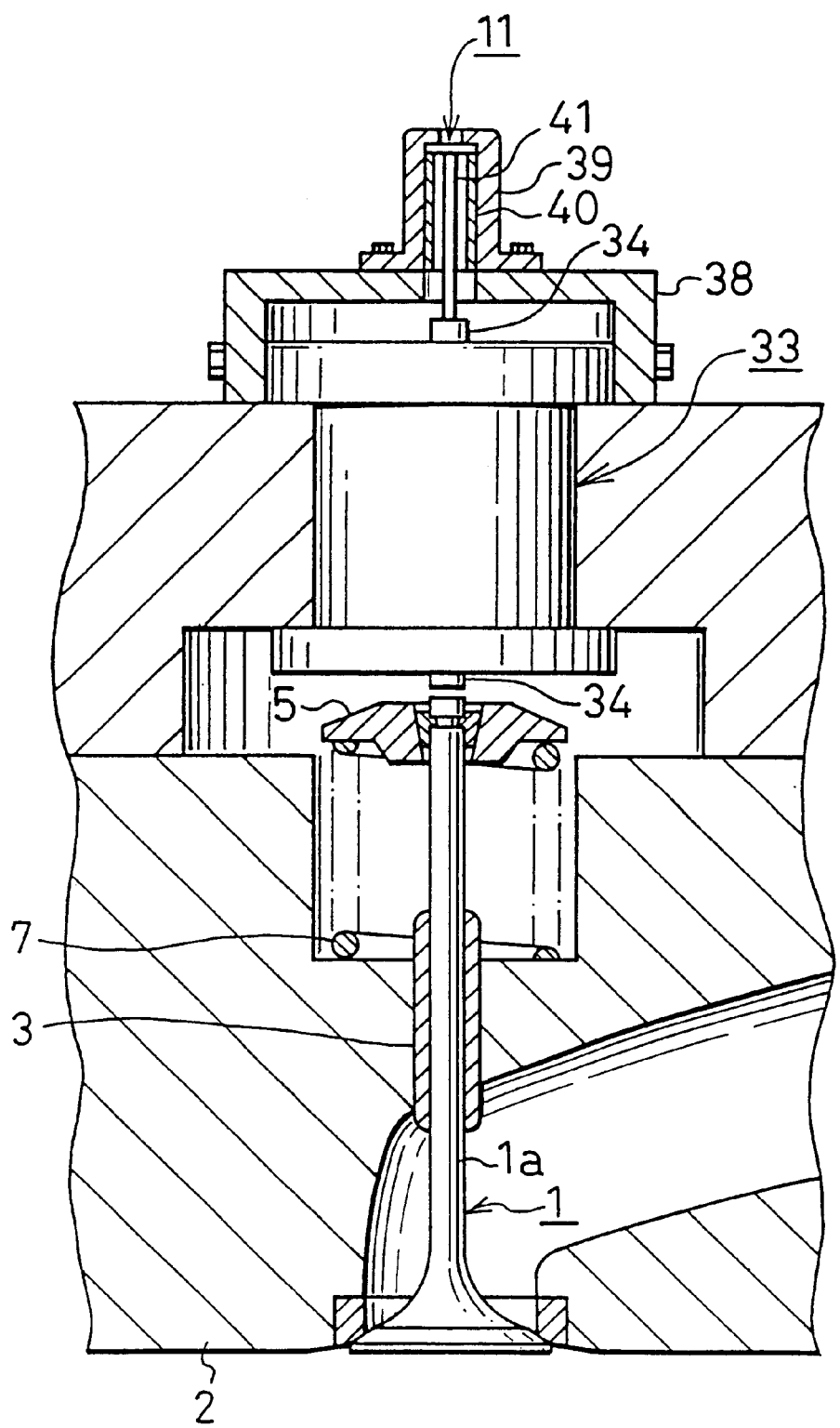
FIG. 8 is a central vertical sectioned front view of a direct acting type valve operating mechanism which has the sixth embodiment of a valve position detector according to the present invention.

FIGS. 6 to 8 illustrate embodiments in which the present invention is applied to a valve operating mechanism which has an electromagnetic actuator. In the fourth embodiment of FIG. 6, an inductivity variable capacity electrode 11 which comprises a first fixed electrode 26, a second fixed electrode 27 and a dielectric 28 is provided between a cylinder head 2 and valve spring retainer 5 When a valve 1 is driven by vertical position of a drive shaft 34 of an electromagnetic actuator 33 above a valve stem 1a of the valve 1, its position is detected.

In the fifth embodiment of FIG. 7, a variable capacity electrode 11 is provided between a valve spring retainer 5 and an electromagnetic actuator 33. First and second fixed electrode 26 and 27 are fixed on the lower surface of an electromagnetic actuator 33 concentrically with the valve 1, and a dielectric 28 is fixed on the upper surface of the valve spring retainer 5.

In the sixth embodiment of FIG. 8, an opposing area variable capacity electrode 11 is provided above an electromagnetic actuator 33. A cap-like insulating electrode holder 39 is mounted in the middle of the upper surface of a bracket 38 fixed to the upper end of the electromagnetic actuator 33. A conductive cylindrical fixed electrode 40 is engaged in the inner surface of the electrode holder 39. A conductive rod-like moving electrode 41 is integrally formed with a drive shaft 34 which is projected from the upper end of the electromagnetic actuator 33. The moving electrode 41 is engaged in the fixed electrode 40 with play to form the opposing area variable capacity electrode 11.

In the embodiments in FIGS. 6 and 7, the variable capacity electrode 11 may be formed as an opposing area varying form similar to that in FIG. 1, but is not shown.

In the embodiments in FIGS. 6 to 8, the drive shaft 34 is moved up and down owing to operation of the electromagnetic actuator 33, and opening/closing position of the valve 1 changes electrostatic capacity of the electrodes 26,27 and 40, so that vertical position of the valve 1 can be detected directly or indirectly via the drive shaft 34.

As shown in the embodiment in FIG. 7, the variable capacity electrode 11 is provided between a valve spring retainer 5 and the electromagnetic actuator 33. Therefore, an outer diameter of the electrode is not limited, so that flexibility in design of the electrodes and valve operating parts is increased, which is advantageous compared with the electrodes in a valve spring 7. Sprays of lubricating oil are not adhered to the electrodes to prevent measurement error.

As shown in FIG. 8, the variable capacity 11 is provided above the electromagnetic actuator 33 to prevent adhesion of lubricating oil to the electrodes, thereby achieving high accuracy measurement and facilitating maintenance.

Figure 9:
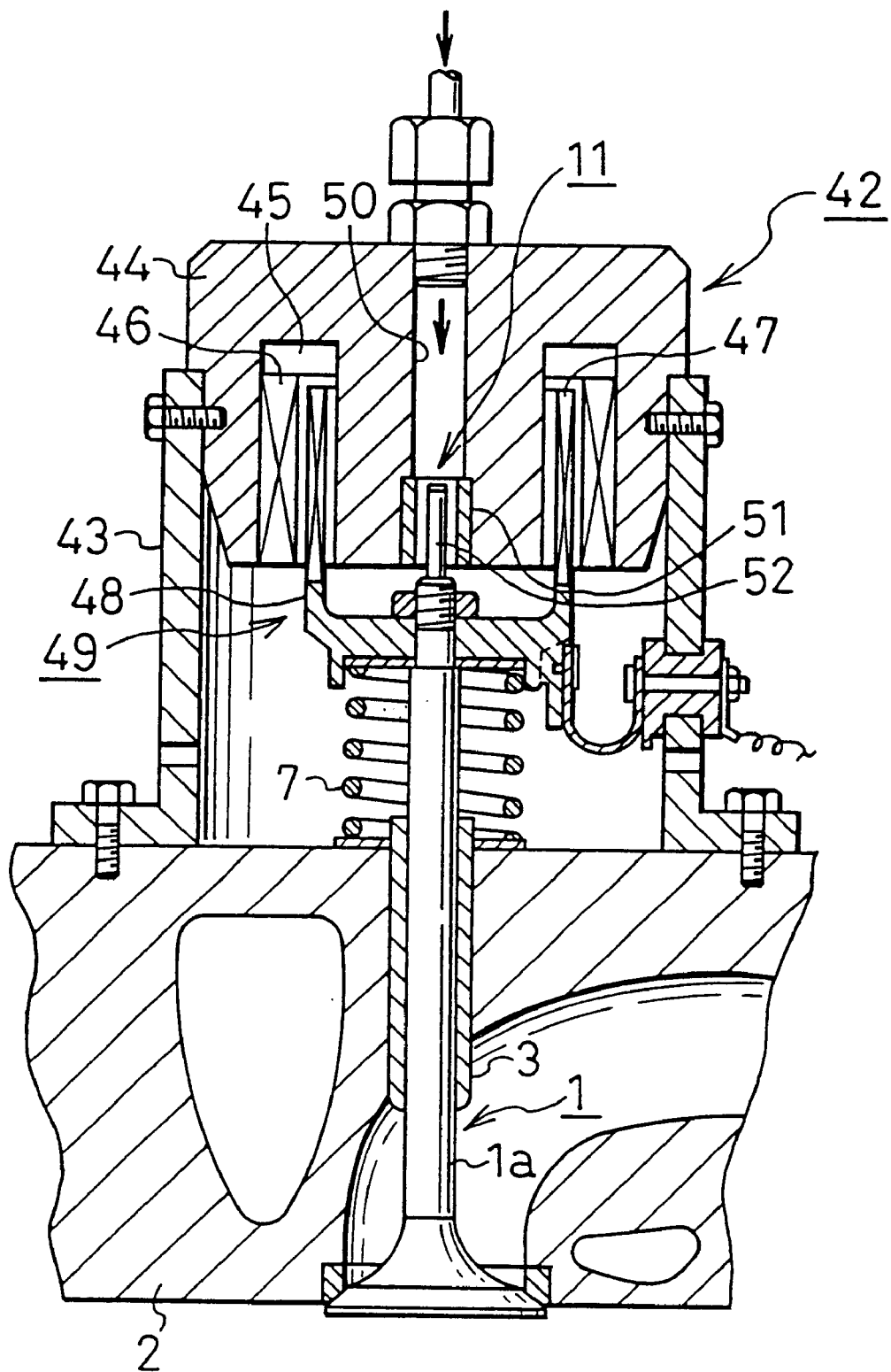
FIG. 9 is a central vertical sectioned front view of a direct acting type valve operating mechanism which has the seventh embodiment of a valve position detector according to the present invention.
Figure 10:
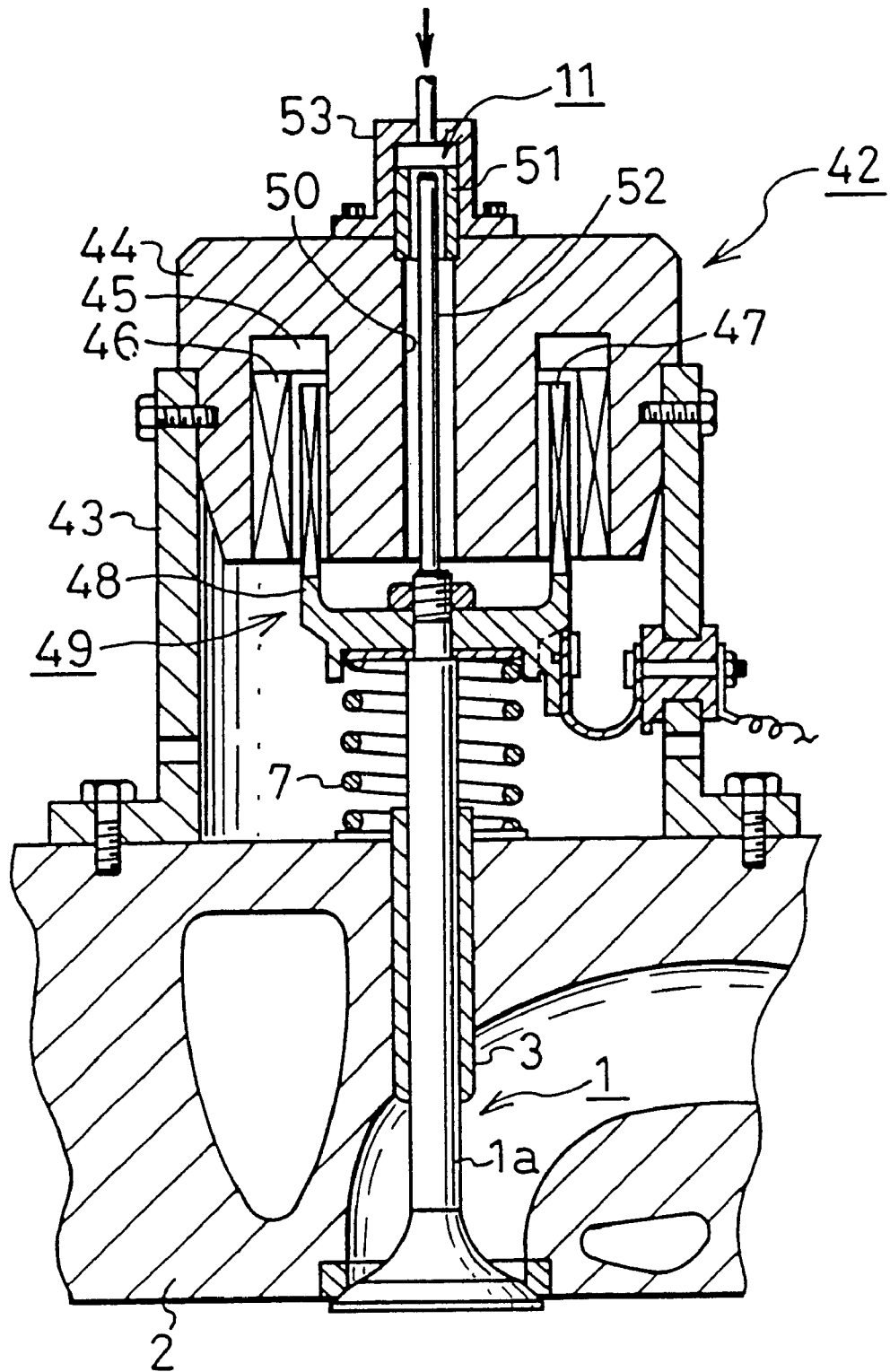
FIG. 10 is a central vertical sectioned front view of a direct acting type valve operating mechanism which has the eighth embodiment of a valve position detector according to the present invention.

FIGS. 9 and 10 illustrates the seventh and eighth embodiment in which the present invention is applied to an electromagnetic actuator type valve operating mechanism called a voice coil motor.

A electromagnetic actuator 42 as shown in FIGS. 9 and 10 comprises an iron yoke 44 concentrically fixed with a valve 1 on the upper surface of a cylinder head 2 via a cylindrical bracket 43, a cylindrical permanent magnet 46 fixed in an annular space 45 of the yoke 44 to have an outer N pole and an inner S pole (or vice versa), and a valve driver 49 which has a cylindrical bobbin 48 fixed to the upper end of the valve between the permanent magnet 46 and the yoke 44, a moving coil 47 being wound around the bobbin 48. When an electric current is applied to the moving coil 47, radial magnetic flux is formed between the coil 47 and the permanent magnet 46, and axial force is generated to the moving coil 47 according to Fleming's Left Hand Rule to move the valve driver 49 axially to open and close the valve 1.

In the embodiment as shown in FIG. 9, a variable capacity electrode 11 is provided between the upper end of the valve 1 and the lower end of an air hole 50 at the center of the yoke 44 coaxially with the valve 1. A cylindrical conductive fixed electrode 51 fits on the inner surface of the lower portion of the air hole 50, and a cylindrical conductive fixed electrode 51 projects upwards from the end of the valve 1. By inserting the moving electrode 52 in the fixed electrode 51 with play, an opposing area variable capacity electrode 11 is formed.

In the embodiment as shown in FIG. 10, a variable capacity electrode 11 may be provided at the upper end of a yoke 44. In a cap-like electrode holder 53 on the upper surface of the yoke 44, a fixed electrode 51 similar to the above is provided, and a moving electrode 52 projects from the upper end of a valve 1 through an air hole 50 and engaged in the fixed electrode 51 with play.

In a valve operating mechanism which has a voice coil motor type electromagnetic actuator 42 as shown in FIGS.

9 and 10, owing to opening/closing position of the valve 1, an opposing area between the fixed and moving electrodes 51 and 52 is changed to vary electrostatic capacity, thereby detecting vertical position of the valve 1 at high accuracy.

Figure 11:
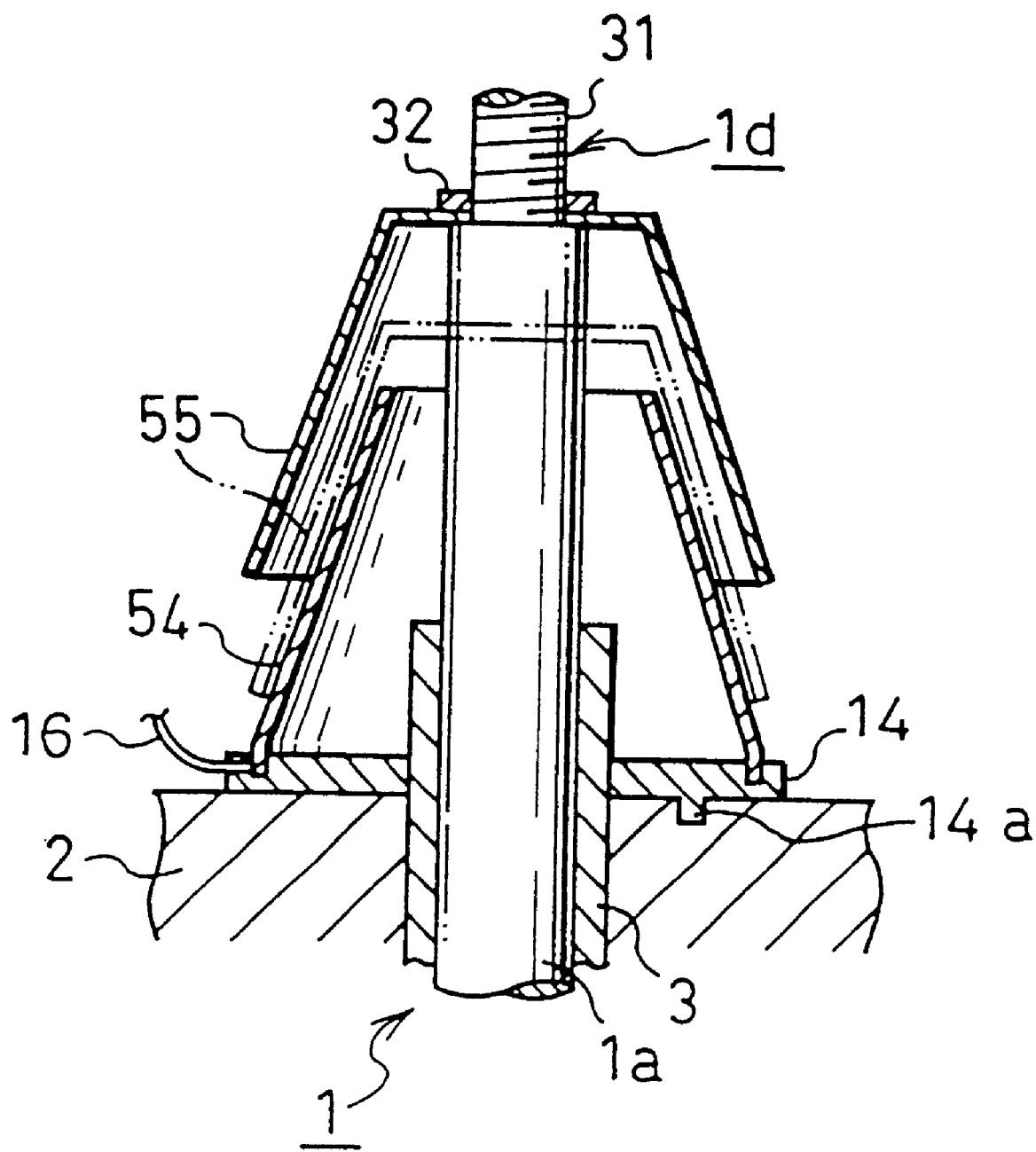
FIG. 11 is a central vertical sectioned front view of a variation of a variable capacity electrode in FIG. 5.

FIG. 11 illustrates a variation of the variable capacity electrode in FIG. 5. A frustum-shaped fixed electrode 54 is covered with a frustum-shaped moving electrode 55 to form an opposing distance varying electrode.

Vertical movement of the moving electrode 55 changes distance with the fixed electrode 54 and electrostatic capacity, so that position of the valve 1 can be determined.

The opposing surfaces of the electrodes 54 and 55 are inclined with respect to an axis of the valve 1, so that variation in relative distance between the electrodes 54 and 55 can be decreased with respect to axial movement of the moving electrode 55. Therefore, compared with an ordinary opposing distance changing sensor in which flat electrodes are opposed to each other, sensitivity is increased, and the invention is also applied to a high-lift type valve.

Such an opposing distance variable capacity electrode may be applied to the embodiment in FIG. 1.

The present invention is not limited to the foregoing embodiments.

The moving electrode in FIG. 1 and the dielectric in FIG. 4 may be formed as a reversed cup and may be directly mounted to the valve stem 1a of the valve 1. The fixed electrodes 12, 26, 27, 29, 54 in FIGS. 1, 4, 5 and 11 may be placed in a bore in the cylinder head 2 and the fixed electrode and dielectric may be positioned above it. Thus, a projection of the variable capacity electrode from the cylinder head becomes shorter, thereby decreasing size of the whole valve operating mechanism and cylinder head.

In the embodiments in FIGS. 1, 4, 6 and 7, the moving electrode 13 and the dielectric 28 may be fixed to the valve spring retainer 5 by adhering, screwing, meshing and welding instead of press-fitting, and what is shown in FIG. 1 may be integrally formed with the valve spring retainer 5.

In the embodiments of FIGS. 1 and 5, the fixed electrode 12, 29 is positioned inside the moving electrode 13, 30. In the embodiment of FIG. 11, the fixed electrode 54 may be positioned around the moving electrode 55.

In the embodiments of FIGS. 1 and 5, the moving electrodes 12, 29 may be electrically connected to the cylinder head 2 as earth potential, and the moving electrode 13, 30 may be insulated against the valve spring retainer 5 and connected to a lead.

In the embodiments of FIGS. 1 and 4, to prevent foreign substance from invading between the electrodes, the bellows-like cover 18 may be provided to cover an inner opening end as shown by a two-dotted line.

In the embodiments of FIGS. 6 and 7, the variable capacity electrode 11 may comprise an opposing area varying type as shown in FIG. 1.

The present invention may be applied to a rocker arm valve operating mechanism or a hydraulic valve operating mechanism.

Other modifications and changes may be made by person skilled in the art without departing from the scope of claims wherein:

What is claimed is:

1. A valve position detector for detecting a position of a poppet valve driven by a valve operating mechanism, a valve stem of said valve being slidably supported by a cylinder head, said detector comprising:

a variable capacitance electrode of an electrostatic capacitance sensor configured for detecting a position of said valve by detecting a variation in electrostatic capacitance when said valve is moved, said variable capacitance electrode being provided between said cylinder head or a stationary member integrally formed therewith, and said valve or a member which follows said valve, wherein an electromagnetic actuator is provided to move the valve up and down, and wherein an external thread is formed at a lower end of said electromagnetic actuator, and an external thread is formed at an upper end valve, and wherein said two external threads are connected by a connecting member, said variable capacitance electrode comprising a fixed electrode carried by the cylinder block and a moving electrode carried by the valve to form an electrostatic capacitance valve displacement sensor.

2. A valve position detector as claimed in claim 1, wherein a bellows-like cover is mounted between an upper end outer circumferential surface of the fixed electrode and an upper end of the moving electrode to prevent foreign substances from invading between the two electrodes.

3. A valve position detector as claimed in claim 1 wherein said variable capacitance electrode comprises a fixed electrode shaped substantially as a frustum of a cone mounted to a support plate on the cylinder head, and a moving electrode shaped substantially as a frustum of a cone mounted to a valve stem of the valve disposed over said fixed electrode.

* * * * *